(12) United States Patent
Ylitalo

(10) Patent No.: US 8,270,375 B2
(45) Date of Patent: Sep. 18, 2012

(54) APPARATUS OF MULTI-ANTENNA TELECOMMUNICATION SYSTEM

(75) Inventor: Juha Ylitalo, Oulu (FI)

(73) Assignee: Elektrobit Wireless Communications Oy, Oulu (FI)

(*) Notice: Subject to any disclaimer, the term of this patent is extended or adjusted under 35 U.S.C. 154(b) by 374 days.

(21) Appl. No.: 12/602,583

(22) PCT Filed: Jun. 28, 2007

(86) PCT No.: PCT/FI2007/050398
§ 371 (c)(1),
(2), (4) Date: Dec. 1, 2009

(87) PCT Pub. No.: WO2009/000964
PCT Pub. Date: Dec. 31, 2008

(65) Prior Publication Data
US 2010/0189055 A1    Jul. 29, 2010

(51) Int. Cl.
*H04W 8/00* (2009.01)
(52) U.S. Cl. .................. 370/334; 455/553.1
(58) Field of Classification Search .......... 370/329, 370/334; 342/359, 378; 455/553.1, 561, 455/562.1
See application file for complete search history.

(56) References Cited

U.S. PATENT DOCUMENTS

| 5,990,832 A * | 11/1999 | Mayrargue ............ 342/380 |
| 7,436,359 B1 * | 10/2008 | Rose ..................... 342/424 |
| 7,469,152 B2 * | 12/2008 | Cetiner et al. .......... 455/562.1 |
| 7,710,319 B2 * | 5/2010 | Nassiri-Toussi et al. ..... 342/377 |
| 8,000,730 B2 * | 8/2011 | Sayeed et al. ............. 455/506 |
| 8,005,164 B2 * | 8/2011 | Oyman ..................... 375/299 |
| 8,014,460 B2 * | 9/2011 | Prasad et al. ............ 375/267 |
| 8,023,457 B2 * | 9/2011 | Kotecha et al. ........... 370/329 |
| 8,024,635 B2 * | 9/2011 | Ismail ..................... 714/752 |
| 8,073,069 B2 * | 12/2011 | Mundarath et al. ....... 375/267 |
| 8,073,486 B2 * | 12/2011 | Mundarath et al. ....... 455/553.1 |
| 2004/0204111 A1 | 10/2004 | Ylitalo |

FOREIGN PATENT DOCUMENTS

| EP | 0849892 A2 | 6/1998 |
| EP | 1365474 A2 | 11/2003 |
| EP | 1841092 A1 | 10/2007 |
| EP | 1833186 A1 | 9/2009 |
| WO | WO2005022681 A2 | 3/2005 |

OTHER PUBLICATIONS

Ylitalo, J., "Double-Directional Beamforming MIMO", Proceedings of the 65th IEEE Vehicular Technology Conference, pp. 2063-2067 (2007).
Mailloux, Robert, J. "Phased Array Antenna Handbook", 2nd Ed., Norwood, MA: Artech House, Inc. ISBN 1-58053-689-1, pp. 53-61 (2005).
Jarske, P. et al., "On Properties and Design of Nonuniformly Spaced Linear Arrays", IEEE Transactions on Acoustics, Speech, and Signal Processing, vol. 36, No. 3, pp. 372-380 (1988).

* cited by examiner

*Primary Examiner* — Brian D Nguyen
(74) *Attorney, Agent, or Firm* — Hoffmann & Baron, LLP

(57) ABSTRACT

An apparatus of a multi-antenna telecommunication system includes a beam forming unit configured to form at least two antenna beams, and a signal feeding unit connected to the beam forming unit and configured to feed beam-specific data streams to the beam forming unit. The beam-specific data streams are allocated to one and the same transceiver of the wireless telecommunication system, and each data stream includes independently and separately encoded data signals.

6 Claims, 2 Drawing Sheets

APPARATUS OF MULTI-ANTENNA TELECOMMUNICATION SYSTEM

CROSS-REFERENCE TO RELATED APPLICATION

This application is a National Phase application of International Application No. PCT/FI2007/050398, filed Jun. 28, 2007, which is incorporated herein by reference.

BACKGROUND

1. Field

The invention relates to an apparatus of a multi-antenna telecommunication system.

2. Description of the Related Art

Modern telecommunication systems use primarily spatial multiplexing or beam forming. In spatial multiplexing, each independent transmit antenna transmits a different data streams. In beam forming, a radiation pattern is created with correlated antenna elements and allocated to a user.

The listed transmission methods are, however, ideal for two extreme radio environments which seldom materialize in practice. Therefore, it is useful to consider alternative communication methods.

SUMMARY

An object of the invention is to provide an improved apparatus. According to an aspect of the invention, there is provided an apparatus of a multi-antenna telecommunication system, the apparatus comprising: a beam forming unit configured to form at least two antenna beams; and a signal feeding unit connected to the beam forming unit and configured to feed beam-specific data streams to the beam forming unit, wherein the beam-specific data streams are allocated to one and the same transceiver and wherein each beam-specific data stream comprises different data.

The invention provides several advantages. In an embodiment of the invention, the beamforming transmission is combined with spatial multi-plexing, wherein the beam-specific data streams are allocated to a one and the same transceiver of the wireless telecommunication system and wherein each data stream carries different information. As a result, gain is increased in the multi-antenna receiver, while the benefits of spatial multiplexing are obtained.

BRIEF DESCRIPTION OF THE DRAWINGS

In the following, the invention will be described in greater detail with reference to the embodiments and the accompanying drawings, in which.

DETAILED DESCRIPTION

Figure 1:
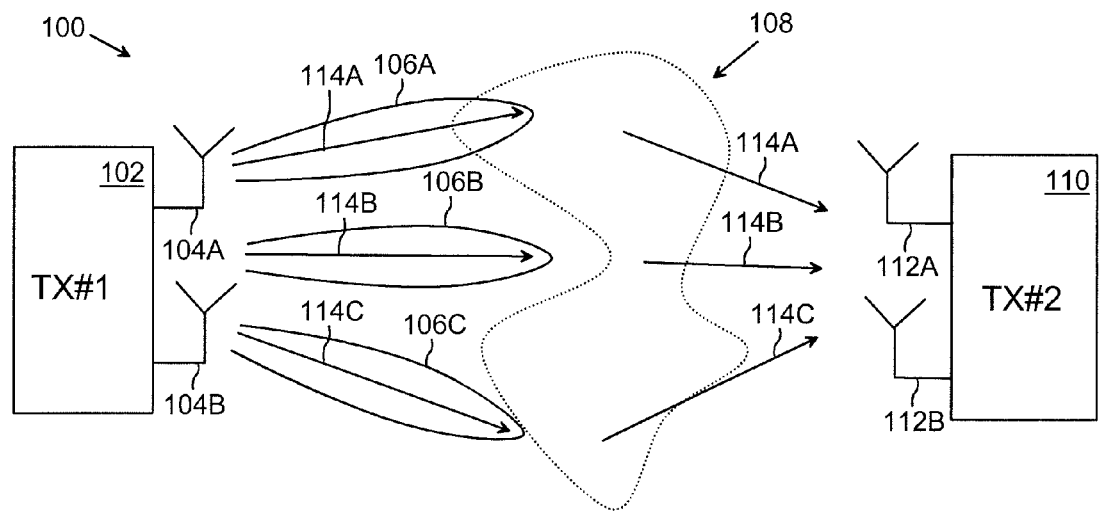
FIG. 1 shows a multi-antenna telecommunication system.

FIG. 1 shows a wireless multi-antenna telecommunication system 100 which comprises a first multi-antenna transceiver (TX#1) 102 and a sec- and multi-antenna transceiver (TX#2) 110. The first multi-antenna transceiver 102 comprises an antenna array with a plurality of antenna elements 104A, 104B. The second multi-antenna transceiver 102 comprises an antenna array with a plurality of antenna elements 112A, 112B.

The multi-antenna telecommunication system 100 may be based on any wireless communication system based on an analogue or digital radio link. Such a multi-antenna telecommunication system 100 comprises WiMAX (Worldwide Interoperability for Microwave Access), Long-Term $3^{rd}$ Generation systems (3GPP LTE), or $4^{th}$ Generation networks, GSM (Global System for Mobile communications), CDMA2000 and its counterparts, WiBro (Wireless Broadband), DVB-h (Digital Video Broadcast-handheld) and satellite communications.

In an embodiment of the invention, the multi-antenna telecommunication system is applied in an automotive application.

The radio environment factors, such as geographical obstacles or buildings, are referred to with reference numeral 108.

The first multi-antenna transceiver 102 forms transmit antenna beams 106A, 106B, 106C which transmit beam-specific data streams 114A, 114B, 114C allocated to the second transceiver 110. The beam-specific data streams 114A to 114C are received by the antenna array of the second trans-ceiver 112.

In an embodiment of the invention, the transceiver 102 is part of a base transceiver station of a multi-antenna telecommunication system.

In an embodiment of the invention, each beam-specific data stream 114A to 114C comprises different data when compared to another beam-specific data stream 114A to 114C, thus following a spatial multiplexing trans-mission scheme applied to a beamforming transmission.

Three different schemes may be used in multi-antenna transmission. These are beamforming, space-time coding, or spatial multiplexing.

In beamforming, a single data stream is passed to each of the antennas of the antenna array by weighting an antenna signal differently by a complex weight coefficient. A narrow antenna beam can be directed to the desired direction by applying appropriate antenna weights. Beamforming brings the array gain to the transmitted signal, which improves the SINR (Signal-to-Interference-and-Noise Ratio) at the receiver.

In the space-time coding mode, the data stream is transmitted from at least two antennas in such a manner that transmitted data symbols are coded over the antennas. An Alamouti coding or any other known block coding or linear dispersion coding technique may be employed. In space-time coding, the data rate is not usually increased, but an increase in the diversity gain is obtained to improve the robustness of the radio link.

In the spatial multiplexing mode, three different approaches can be considered: the vertical, horizontal or diagonal encoding. The vertical and horizontal BLAST (Bell Labs Layered Space-Time architecture) techniques are examples of the first two schemes. Moreover, the PARC (Per-Antenna Rate Control) scheme is another example of horizontal encoding.

In vertical encoding, the data stream is first modulated and encoded, after which it is split into multiple parallel data streams. These data streams are then transmitted simultaneously from multiple antennas. In theory, the data rate can be increased by a factor of M, where M is the number of antennas.

In horizontal encoding, the data stream is first split into multiple parallel data streams which are then independently modulated and encoded and transmitted from different antennas.

Horizontal encoding offers good adaptation to the radio channel sampled by each antenna and allows significant data rate increase in practical radio systems.

In an embodiment of the invention, the second transceiver 110 also comprises a beam former which generates beams in a similar manner as the transmitter 102.

Spatial multiplexing benefits significantly from the beamforming transmission, since multi-antenna performance is typically dominated by the SNR (Signal-to-Noise) at the second transceiver 110. In this case, the SNR in the second transceiver 110 is greatly improved by the beamforming transmission.

Figure 2:
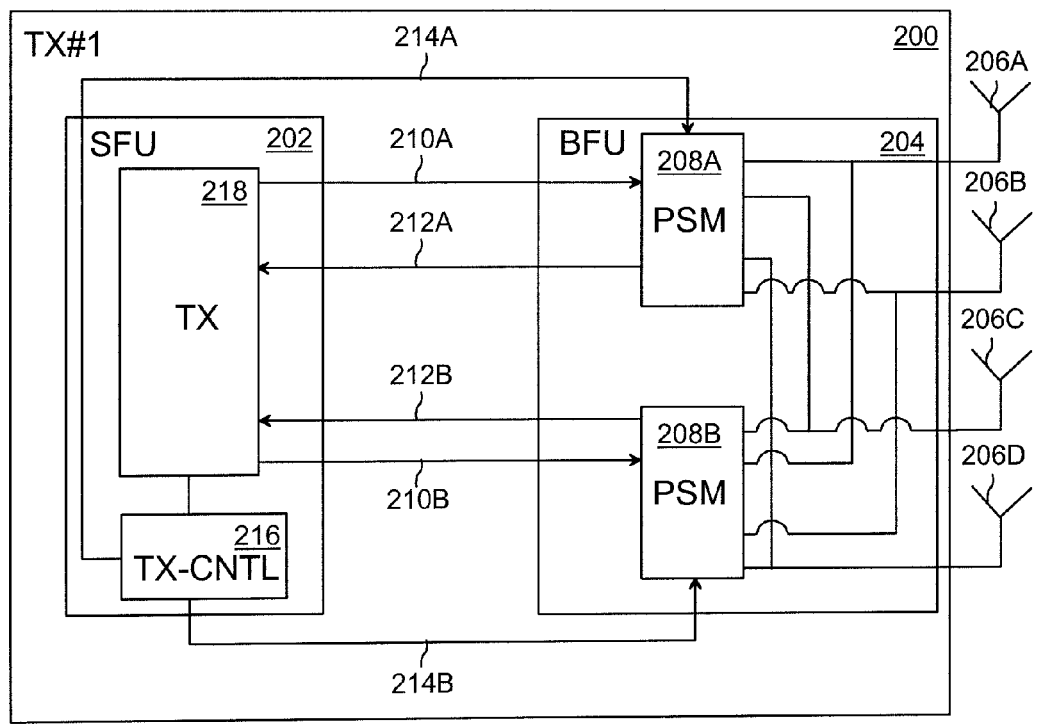
FIG. 2 illustrates an example of a transceiver.

With reference to FIG. 2, the first transceiver 200 comprises a beamforming unit (BFU) 204 and a signal feeding unit SFU (202).

In an embodiment of the invention, the signal feeding unit 202 comprises a transceiver unit (TX) 218 and a transmission controller (TX-CNTL) 216.

The beamforming unit 204 may comprise a plurality of correlated antenna elements 206A, 206B, 206C, 206D which form the antenna beams 106A to 106C based on constructive interference of electromagnetic waves emitted by the individual antenna elements 206A to 206D.

The beamforming unit 204 receives beam-specific data streams 210A, 210B from the signal feeding unit 202 and distributes the beam-specific data streams 210A, 210B into the antenna beams 106A to 106C with weights and phases required for forming the desired antenna beams 106A to 106C.

In an embodiment of the invention, an antenna beam 106A to 106C is formed with a beam-specific antenna hardware which is as such capable of forming a radiation pattern and which may physically be directed to a desired direction.

In an embodiment of the invention, the beamforming unit 204 comprises phase-shift modules 208A, 208B, each of which being connected to at least two correlated antenna elements 206A to 206D. A phase-shift module 208A, 208B receives a beam-specific data stream 210A, 210B and feeds the beam-specific data stream 210A, 210B to the at least two correlated antenna elements 206A to 206D by using beamforming weights and phases required for forming the desired antenna beams 106A to 106C.

In an embodiment of the invention, a phase-shift module 208A, 208B is an analogue phase shifter comprising a plurality of elementary phase shifters. Each elementary phase shifter is coupled to a single antenna element 206A to 206D and implements a signal phase to the specific antenna element 206A to 206D in order to provide a desired antenna beam 106A to 106C. The elementary phase shifters may be implemented with known analogue phase shifting methods, such as a feeder length technique, where an electrical length of a signal path is selected to cause a desired phase shift in signal propagation. Basically, any type of known phase shifters, such as phase shifting hybrids, may be employed. The phase shifting techniques are known to a person skilled in the art and will not be described in detail in this context.

In an embodiment of the invention, the phase-shift modules 208A to 208B are adjustable with control signals 214A, 214B. The phase-shift modules 208A to 208B may be adjusted so as to dynamically steer the antenna beams 106A to 106C to a desired direction or in order to direct fixed beams 106A to 106C to a desired direction. The control signals 214A, 214B may, for example, control the effective delay line in the elementary phase shifters.

In an embodiment of the invention, the beam forming unit 204 implements spatial sampling of a signal transmitted from the second transceiver 110 by using the antenna beams 106A to 106C. The beamforming module 102 receives signals from the second transceiver 110 and relays the receive signals 212A, 212B to the transceiver unit 218. The transceiver unit 218 may determine receive characteristics, such as the signal phase and strength of the receive signals 212A, 212B, and relay the receive characteristics to the trans-mission controller 216.

The transmission controller 216 may calculate optimum transmission characteristics of the beam-specific data streams 114A to 114C and instruct the transceiver unit 218 to implement the optimum transmission characteristics to the beam-specific data streams 210A, 210B and/or the control signals 214A, 214B on the basis of the receive characteristics.

The transmission characteristics include transmission weights, transmission power, modulation, and/or coding scheme.

Depending on the radio channel state, the modulation order and the channel coding rate may be adjusted so that the data rate, for example, is maximized. Alternatively, the modulation order and the channel coding rate may be adjusted in such a way that the transmission range can be maximized.

In an embodiment of the invention, the transmission characteristics define the transmission mode. The transmission characteristics may imply that beamforming is the preferred transmission mode, in which case only one data stream with specific modulation and coding scheme is transmitted to the preferred beam direction.

In another case, the transmission characteristics may imply that spatial multiplexing over two or more beams is the preferred transmission mode. It is noted that the transmission characteristics may also indicate the preferred number of beams which are applied to spatial multiplexing.

The transmission characteristics may also imply that instead of spatial multiplexing, space-time coding over at least two beams is the preferred transmission technique. In this case, any space-time coding technique such as block coding, trellis coding or linear dispersion coding can be applied. These coding techniques are known to a person skilled in the art and will not be described in detail in this context.

In an embodiment of the invention, the number of antennas 206A to 206D is larger than the number of antenna beams 106A to 106C. This also means that the number of antennas 206A to 296D is greater than the number of the beam-specific signals 210A to 2128. This preferably enables narrow and high-gain beams with a limited number of required feeder cables from the base station unit to the antenna unit.

In an embodiment of the invention, the beamforming unit 204 is suitable for tower-top installation. In such a case, the beamforming unit 204 comprises a housing which protects the phase-shift modules 208A, 208B and the antenna elements 206A to 206C from environmental stress. The beamforming unit 204 may further be coupled to the signal feeding unit 202 by a cable. In an embodiment of the invention, the signal feeding unit 202 is integrated into the beamforming unit 204 which both are configured for tower top installation.

Figure 3:
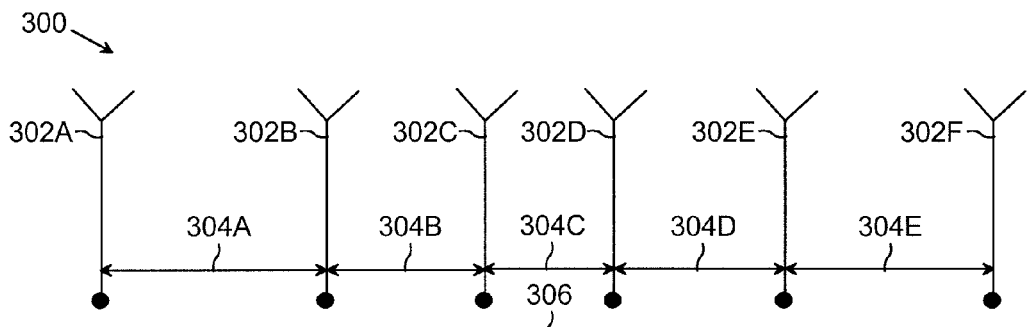
FIG. 3 shows an example of an antenna arrangement.

With reference to FIG. 3, an antenna group 300 of the beam forming unit 204 comprises correlated antenna elements 302A to 302F with an average separation from one another of more than half of the communication carrier frequency wavelength. The average separation of such a measure results in that the overall effective width 306 of the antenna group 300 is greater than that of a conventional $\lambda/2$ antenna group, thus resulting in greater effective array aperture and narrower antenna beams. The narrower antenna beams increase the antenna gain and improve the performance of the second transceiver 110.

The correlated antenna elements 302A to 302F may be arranged in a row or column configuration with separations 304A to 304E. The separation 304A, 304E between the outermost successive antenna elements 302A, 302B and 302E, 302F, respectively, may be greater than the separation 304C of middle antenna elements 302C, 302D. Moreover, the antenna array may be configured in a two-dimensional manner, where the antenna elements in a column define at least one beam in the elevation domain and the antenna elements in a row define at least one beam in the azimuth domain.

Figure 4:
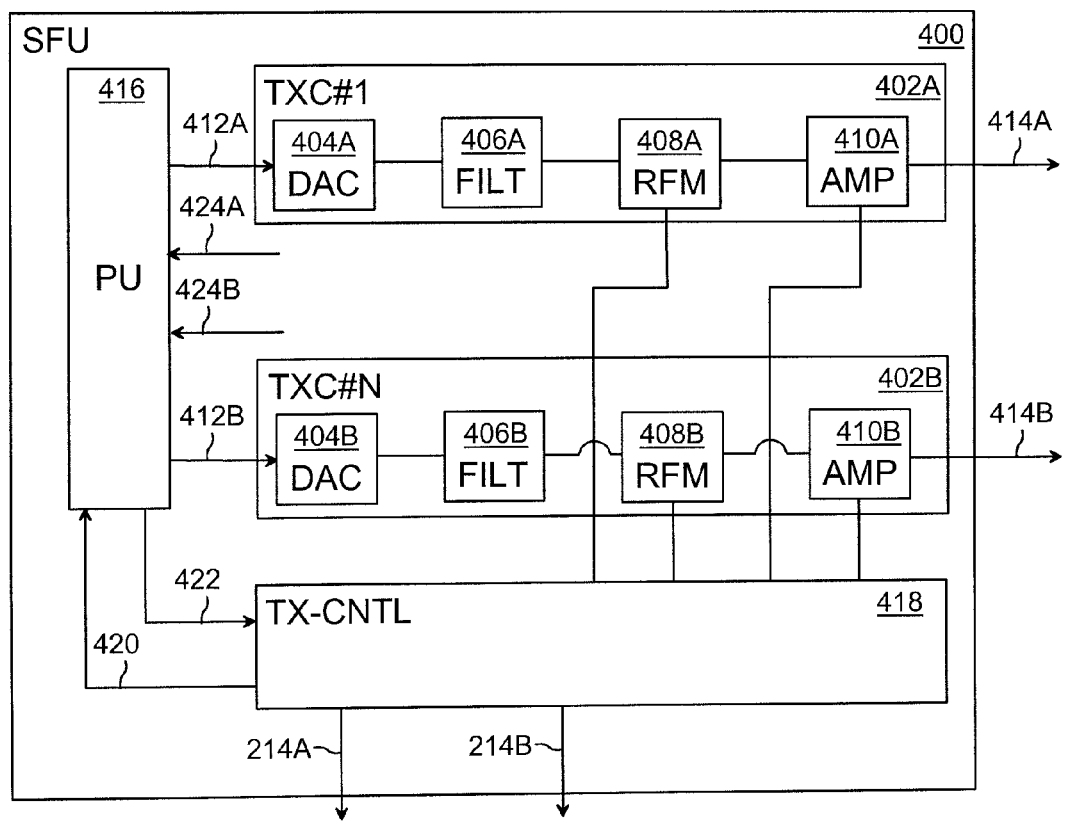
FIG. 4 shows an example of a signal feeding unit.

The signal feeding unit 400 is shown in greater detail in FIG. 4.

The signal feeding unit 400 may comprise transmission chains (TXC#1, . . . , TXC#N) 402A to 402B and a processing unit (PU) 416. The transmission chain 402A, 402B receives a digital beam-specific signal 412A, 412B from the processing unit 416 and transforms each digital beam-specific signal 412A, 412B into a radio frequency beam-specific signal 414A, 414B. A trans-mission chain 402A, 402B is coupled to a corresponding phase shift module 208A to 208B, and a radio frequency beam-specific signal 414A, 414B is inputted into the corresponding phase-shift module 208A, 208B.

The signal feeding unit 400 may further comprise receive chains not shown in FIG. 4. The receive chains are coupled to the antenna elements 206A to 206D and convert the radio frequency receive signal to a digital receive signal 424A, 424B. The digital receive signal 424A, 424B is inputted into the processing unit 416 which may determine receive characteristics of the receive signals.

The radio frequency beam-specific signals 414A, 414B include beam-specific data streams 210A, 210B. Thus, each transmission chain 402A, 402B may be specific to an antenna beam 106A to 106C.

The processing unit 416 generates the digital beam-specific signal 412A, 412B. The generation of the digital beam-specific signal 412A, 412B may comprise weighting a digital beam-specific signal 412A, 412B, modulating the digital beam-specific signal 412A, 412B according to a modulation scheme, such as as BPSK, QPSK, 16QAM, 64QAM, and 256QAM, and coding the signal with a preferred code rate. Any channel coding scheme, such as convolutional coding or convolutional turbo coding, known to a person skilled in the art may be applied.

In an embodiment of the invention, a transmission chain 402A, 402B comprises a digital-to-analogue converter (DAC) 404A, 404B for converting the digital beam-specific signal 412A, 412B into an analogue beam-specific signal.

In an embodiment of the invention, the transmission chain 402A, 402B comprises a filter (FILT) 406A, 406B for regulating the frequency distribution of the analogue beam-specific signal. Alternatively, filtering may be done in the digital domain.

In an embodiment of the invention, the transmission chain 402A, 402B comprises a radio frequency modulator (RFM) 408A, 408B for converting the analogue beam-specific signal into a radio frequency beam-specific signal.

In an embodiment of the invention, the transmission chain 402A, 402B comprises an amplifier 410A, 410B for amplifying the radio frequency beam-specific signal so that it may be fed to a phase-shift module 208A, 208B.

As each phase-shift module 208A, 208B utilizes at least two antenna elements 206A to 206D, the number of phase-shift modules 208A, 208B and thus the number of transmission chains 402A, 204B and associated feeding means, such as cables, may be less than the number of antenna elements 206A to 206D. This decreases the complexity and costs of the transceiver 200.

A transmission controller 418 receives the receive characteristics 422 of the receive signals and generates control signals 214A, 214B for the phase-shift modules 208A, 208B and a control signal 420 for the processing unit 416. The transmission controller 418 may further control the radio frequency modulators 408A, 408B and the amplifiers 410A, 410B with corresponding control signals.

The processing unit 416 receives the control signal 420 and adjusts the transmission characteristics accordingly.

In an embodiment of the invention, the processing unit 416 determines the power of the receive signals received by a receive antenna beam. The power information is inputted to the transmission controller 418 which decides which transmission scheme will be used. If an analysis shows that the receive signal is primarily received with certain antenna beam or antenna beams 106A to 106C, the transmission controller 416 may direct the transmission to those beams 106A to 106C. In an extreme case, only one antenna beam 106A to 106C is used, which corresponds to a normal beam forming case.

On the other hand, if the analysis shows a rich scattering and wide angular spreading of impinging signals, the transmission controller 418 may choose a MIMO transmission scheme and instruct the processing unit 416 and the phase-shift modules 208A, 208B to implement the MIMO transmission scheme. Thus, the beamforming unit 204 and the signal feeding unit 202 may be configured to implement the MIMO transmission scheme. When the MIMO transmission scheme is used, space-time coding or spatial multiplexing can be applied. In the space-time coding mode, the data stream is transmitted from at least two antenna beams 106A to 106C in such a manner that transmitted data symbols are coded over the antenna beams 106A to 106C.

The preferred antenna beams 106A to 106C are defined by the transmission controller 216 which calculates optimum transmission characteristics of the beam-specific data streams 114A to 114C and instructs the trans-ceiver unit 218 to implement the optimum number of the beam-specific data streams 210A, 210B. For example, the transmission controller 216 may apply the Alamouti coding technique to antenna beams 106A and 106C, if these antenna beams have the best transmission characteristics with regard the trans-ceiver 110. In the spatial multiplexing mode vertical, horizontal or diagonal encoding can be applied. For example, the BLAST or PARC schemes may be employed.

In vertical encoding, the data stream is first modulated and encoded and then split into multiple parallel data streams in the transceiver unit 218. The preferred antenna beams are defined by the transmission controller 216 which selects the best antenna beams and instruct the transceiver unit 218 to implement the selected number of beam-specific data streams 210A, 210B.

In the horizontal encoding technique, the data stream is first split into multiple parallel data streams, after which each of the parallel data streams are independently modulated and encoded in the transceiver unit 218. The number of preferred parallel beam-specific data streams 114A to 114C is defined by the transmission controller 216 which selects the best antenna beams and instructs the transceiver unit 218 to implement the selected number of beam-specific data streams 210A, 210B.

The transmission controller 418 may be implemented with a digital processor, memory, and software. In an embodiment of the invention, the transmission controller 418 is implemented in the processing unit 416.

The transmission controller 418 may further comprise analogue circuitry for generating analogue control signals for the phase-shift modules 208A, 208B, the radio frequency modulators 408A, 408B and the amplifiers 410A, 410B.

Even though the invention has been described above with reference to an example according to the accompanying drawings, it is clear that the invention is not restricted thereto but it can be modified in several ways within the scope of the appended claims.

What is claimed is:

1. An apparatus of a multi-antenna telecommunication system, the apparatus comprising:
   an analogue radio frequency level beam forming unit comprising a plurality of correlated antenna elements configured to form at least two antenna beams, the plurality of correlated antenna elements comprising an average separation of more than half of a communication carrier wavelength, the analogue radio frequency level beam forming unit comprising at least one phase-shift module connected to at least two correlated antenna elements and configured to receive a beam-specific data stream and feed the beam-specific data stream to the at least two correlated antenna elements by using beam forming phases which implement a chosen antenna beam, the correlated antenna elements being arranged in at least one row or column, and the separation between outermost successive antenna elements being greater than separation between middle antenna elements; and
   a signal feeding unit connected to the beam forming unit and configured to feed beam-specific data streams to the beam forming unit, wherein the beam-specific data streams are allocated to one transceiver and wherein each beam-specific data stream comprises different data.

2. The apparatus of claim 1, wherein the number of correlated antenna elements is larger than the number of antenna beams.

3. The apparatus of claim 1, wherein the beam forming unit is suitable for tower top installation.

4. The apparatus of claim 1, further comprising a transmission controller connected to the beam forming unit and configured to adjust transmission characteristics of the beam-specific data streams on the basis of signals received by the at least two antenna beams.

5. The apparatus of claim 1, further comprising a mobile terminal, the mobile terminal comprising the analogue radio frequency level beam forming unit and the signal feeding unit.

6. A base transceiver station comprising:
   an analogue radio frequency level beam forming unit comprising a plurality of correlated antenna elements configured to form at least two antenna beams, the plurality of correlated antenna elements comprising an average separation of more than half of a communication carrier wavelength, the analogue radio frequency level beam forming unit comprising at least one phase-shift module connected to at least two correlated antenna elements and configured to receive a beam-specific data stream and feed the beam-specific data stream to the at least two correlated antenna elements by using beam forming phases which implement a chosen antenna beam, the correlated antenna elements being arranged in at least one row or column, and the separation between outermost successive antenna elements being greater than separation between middle antenna elements; and
   a signal feeding unit connected to the beam forming unit and configured to feed beam-specific data streams to the beam forming unit, wherein the beam-specific data streams are allocated to one transceiver and wherein each beam-specific data stream comprises different data.

* * * * *

UNITED STATES PATENT AND TRADEMARK OFFICE
CERTIFICATE OF CORRECTION

PATENT NO. : 8,270,375 B2
APPLICATION NO. : 12/602583
DATED : September 18, 2012
INVENTOR(S) : Juha Ylitalo Page 1 of 1

It is certified that error appears in the above-identified patent and that said Letters Patent is hereby corrected as shown below:

In the Specifications:

Column 5, line 64:

Now reads:     "...transmission chains 402A, 204B..."

Should read:     -- transmission chains 402A, 404B... --

Signed and Sealed this
Sixteenth Day of July, 2013

Teresa Stanek Rea
*Acting Director of the United States Patent and Trademark Office*